Feb. 1, 1966 H. D. BRUIJEL 3,232,096
DEVICE FOR THE INDICATION OF THE MOVEMENT OF AN OBJECT
Filed May 15, 1964
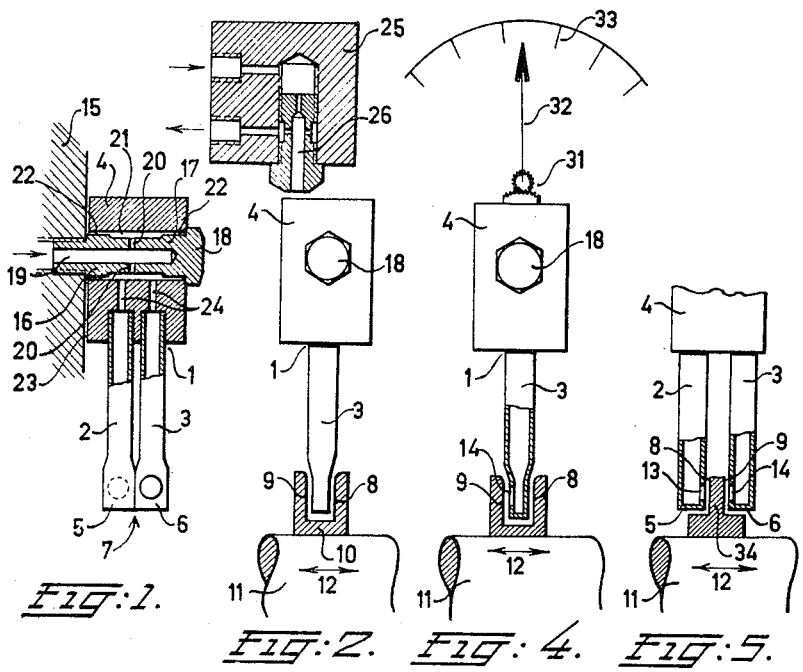
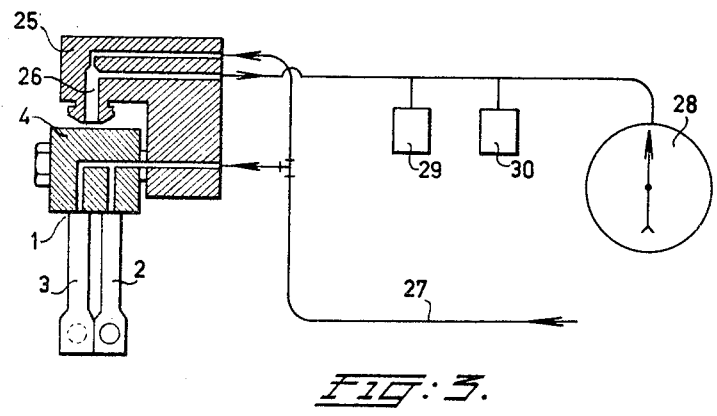
INVENTOR.
HENDRIK DANIEL BRUIJEL
BY
Edmund M. Jaskiewicz

United States Patent Office 3,232,096
Patented Feb. 1, 1966

3,232,096
DEVICE FOR THE INDICATION OF THE MOVEMENT OF AN OBJECT
Hendrik Daniel Bruijel, Velp, Netherlands, assignor to N.V. Motorenfabriek Thomassen, a Dutch limited-liability company, De Steeg, Netherlands
Filed May 15, 1964, Ser. No. 367,802
4 Claims. (Cl. 73—37.6)

The invention relates to a device for the indication of a displacement of an object, especially a displacement of a rotary shaft with the aid of a pivotal recording arm, which is coupled to a detector or other impulse giving device, the free end of the recording arm cooperating with two oppositely directed operative surfaces of the object.

A device of the aforementioned kind is known, in which device the movement of an object is recorded by a rod-shaped recording arm, the free end of which, provided with one or more rollers, trails in a groove with two operative surfaces of e.g. a rotary shaft. Alternatively if a ring with a radially outwardly directed ridge or collar is provided around the shaft, the free end of the recording arm is fork shaped in order to be capable of cooperation with said collar of the ring. Such a cooperation owing to the fact that the recording arm is in touch with the operative surface of the object involves the production of sound and causes wear and tear on the free end of the recording arm which is hard to be avoided. Owing thereto such a device never gave satisfaction in practice, especially if the object had a high rotational speed.

The invention aims at avoiding these disadvantages in the way that medium jets, especially air jets, are generated between the recording arm and the operative surfaces, the said medium jets imparting oppositely directed reaction forces to the recording arm.

The invention further aims at obtaining an automatic balance of the recording arm, so that during a displacement of the object there is produced a difference in the said reaction forces to which the recording arm responds immediately and thus restores its position of equilibrium between the operative surfaces, so that the position of the recording arm is characteristic for the displacement to be found out.

Due to these features it is ensured that the recording arm during this action cannot touch a working plane.

The device is very sensitive for any displacement of the object irrespective of the medium supplied to the device.

It should be noted that it is known in itself to measure a displacement by means of a pressure medium jet which issues from an aperture. In this case there is measured a pressure of the medium or a difference in pressure. In the event of fast rotating objects the boundary layer obtains influence to an extent, which causes the measured value to differ from the real value. In the device according to the invention the thickness of the boundary air layer, lying against the operative surfaces acts as an additional thickness of said surfaces which due to the symmetry does not influence the position of equilibrium of the free end of the recording arm in between the operative surfaces.

It is a further object of the invention to avoid that the recording arm encounters resistance owing to torsion on account of the reaction forces.

Three embodiments of the device according to the invention are hereinafter clarified with reference to the drawing, in which:

FIG. 1 is a longitudinal section, perpendicular to the direction of displacement of the device according to the invention;

FIG. 2 is a longitudinal section, parallel to the direction of displacement of the device, said device being coupled to an indicator or a recording system by means of air;

FIG. 3 is a diagram showing an example of an indicating system from which appears the arrangement of the device according to the invention;

FIG. 4 represents partially in front view and partially in a longitudinal section, which is parallel to the direction of displacement, a modified embodiment of the device according to FIG. 1, the device being directly mechanically coupled to a measuring device, the free end of the recording arm being interposed between two upright operative surfaces;

FIG. 5 is a view—as contemplated perpendicular to the direction of displacement—of another embodiment of the recording arm, an upright collar with two operative surfaces on either side being provided between the recording arm, which consists of two juxtaposed tubes, arranged so as to be parallel to the direction of displacement.

The embodiment of the device according to the FIGURES 1–3 consists of a recording arm 1, which is constructed from two tubes 2 and 3, containing a pressure medium (e.g. air), the said tubes being suspended in juxtaposition from an axle bearing 4. The two air tubes 2 and 3 are by their closed free ends 5 and 6 secured to one, the other at 7, the said free end 7 being placed between two operative surfaces 8 and 9 on the inner side of a U-shaped ring 10, which is secured upon a for instance rotary shaft 11, the axial displacement (vide arrow 12) of which should be measured. Provided in the proximity of the ends 5 and 6 of the air tubes 2 and 3 and on the side walls thereof are air flow apertures 13 and 14, from which two oppositely directed air jets issue so as to be perpendicular to the reaction surfaces (operative surfaces) 8, 9, respectively on the inner side of the U-shaped ring 10, so that the reaction forces of the air jets on the air tubes hold same in equilibrium between the operative surfaces 8 and 9. An axle 16 which is secured to a stationary recording arm holder 15 has on its protruding end 17 a bolt head 18 and an air conducting axial bore 19, from which the fed air flows through apertures 20 provided transverse through the axle 16, into a space 21. This space is obtained in the way that the stub axle diameter is reduced in the central portion between two bearing surfaces 22. On building an air cushion the air partially escapes between the bearing surfaces 22 and the axle bearing 4 and further by way of a slit 23 between the stationary recording arm holder 15 and the axle bearing 4 to the atmosphere. Due to this clearance the axle bearing 4 oscillates practically without friction about the axle 16 in the direction of the arrow 12. The remainder of the compressed air flows through bores 24 in the axle bearing 4 said bores being perpendicular to the axle 16, while air tubes 2 and 3, suspended from the axle bearing 4, are connected to the bores 24.

Depicted in FIG. 2 is the device as contemplated perpendicular to the direction of displacement, the pneumatic measuring element 25 being fixedly arranged on top thereof, the variations of the air pressure in the air tube bore 26 of the said element being a measure of the angular position of the recording arms 1 and consequently of the axial displacements to be measured of the rotary shaft 11.

The recording arm may comprise an even number of juxtaposed air tubes with each tube having a flow aperture. One half of the total number of apertures are directed toward one operative annular surface and the other half to the second operative annular surface.

Represented in FIGURE 3 is a scheme of a measuring and controlling device wherein the recording arm 1 is connected to a compressed air conduit 27, which is also connected to the pneumatic element 25, which is more clearly visible in FIG. 2. There is further represented a manometer 28 for visual observation of variations of the air pressure in the jet tube bore 26 that is to say of the axial displacement of the shaft 11. At definite air pressures an alarm 29 can produce a warning signal, while at a definite maximum/minimum air pressure, pertaining to a maximum admissible axial displacement of the rotary shaft 11 a switching device 30 stops the driving gear of the rotary shaft 11.

Depicted in FIGURE 4 is the device according to FIGURE 1 wherein the axial displacement by way of the recording arm 1 and via the gear wheels 31 is directly and mechanically transmitted to an indicator 32, which is disposed before a graduation 33.

Another embodiment of the recording arm is depicted in FIGURE 5, the air tubes 2 and 3 being juxtaposed in spaced relationship and parallel to the direction of displacement, the free ends 5 and 6 not being connected to one or the other. Between the free ends 5 and 6 of the air tubes 2 and 3 lies an annular collar 34 having on either side the operative surfaces 8 and 9, the said collar being secured upon the shaft 11. Provided in the vicinity of the tube ends 5 and 6 on the side walls of the tubes 2 and 3 are flow apertures 13 and 14, the said flow apertures each directing an air jet so as to be perpendicular to the reaction surfaces 8 and 9, which air jet generates reaction forces upon the tubes 2 and 3. These reaction forces hold the latter tubes in equilibrium on either side of the reaction surfaces 8 and 9 of the annular collar 34.

In the embodiment according to the FIGURES 1–4 there is a very small tilting couple exercised by the bearing 4 upon the axle 16, due to the apertures 13 and 14 lying beside each other. In the embodiment according to FIGURE 5 this tilting couple is nought.

What I claim is:

1. An arrangement for indicating axial displacement of a rotary shaft having two oppositely directed operative annular surfaces perpendicular to the rotational axis of said shaft, and comprising a recording arm having one end freely pivotably mounted on an axis in a plane perpendicular to the rotational axis of said rotary shaft, and its other free end having an even number of juxtaposed tubes which are movable in common with said recording arm, each tube being connected to a source of pressure fluid, each tube having an aperture therein, one half of the total apertures being directed toward one operative annular surface and the other half to the other operative annular surface, and means connected to said recording arm one end for detecting the pivotal movement thereof.

2. An arrangement according to claim 1 wherein said tube apertures are aligned and oppositely directed toward each other so that the tilting couple with respect to the longitudinal axis of the recording arm produced by the resultant of the thrust and reaction forces due to the fluid issuing from said apertures is substantially zero.

3. An arrangement according to claim 1 wherein said recording arm has two juxtaposed tubes, each tube having an aperture directed toward a different one of said operative annular surfaces.

4. An arrangement according to claim 1 and further comprising an axle for pivotally supporting said recording arm one end with substantial clearance around said axle, said axle being perpendicular to a plane through said recording arm and parallel to said shaft rotational axis, said axle having passage means therein opening to the outer surface of said axle so that pressure fluid passes through said axle to the clearance space around said axle.

References Cited by the Examiner

UNITED STATES PATENTS

| 1,946,924 | 2/1934 | Allen et al. | |
|---|---|---|---|
| 3,002,374 | 10/1961 | Jacobs | 73—37.5 |
| 3,174,328 | 3/1965 | Hollister | 73—37.7 |

FOREIGN PATENTS

| 1,251,195 | 12/1960 | France. |
|---|---|---|

OTHER REFERENCES

"Air Lubricated Bearings," Product Engineering, August 1951, pages 112–115.

DAVID SCHONBERG, *Acting Primary Examiner.*

LOUIS R. PRINCE, F. H. THOMSON,
*Assistant Examiners.*